July 14, 1953  E. K. KARLSSON  2,645,075
CORN PICKER ROLL ADJUSTING MECHANISM
Filed Nov. 16, 1949  2 Sheets-Sheet 1
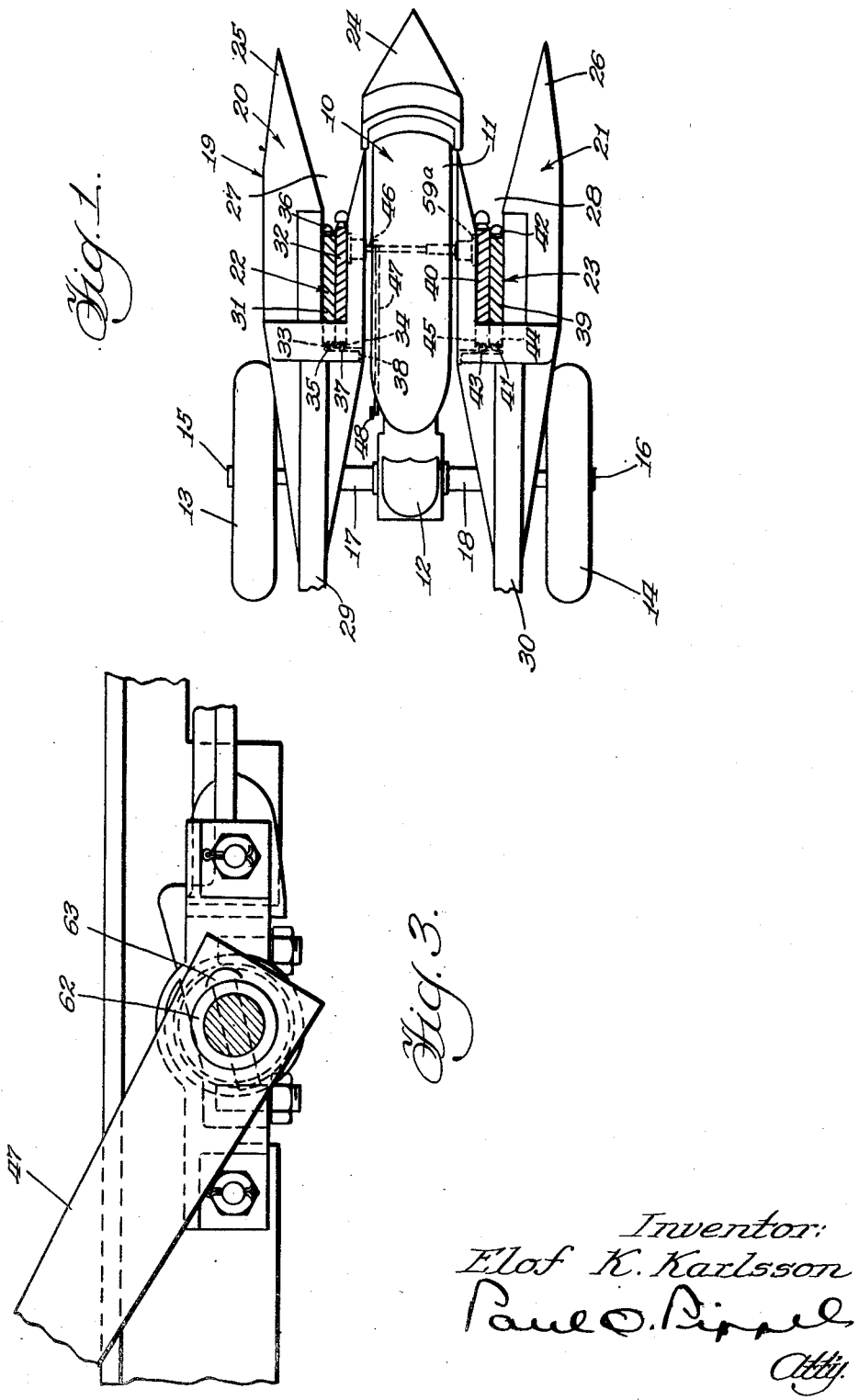
Inventor:
Elof K. Karlsson
Paul O. Pippel
Atty.

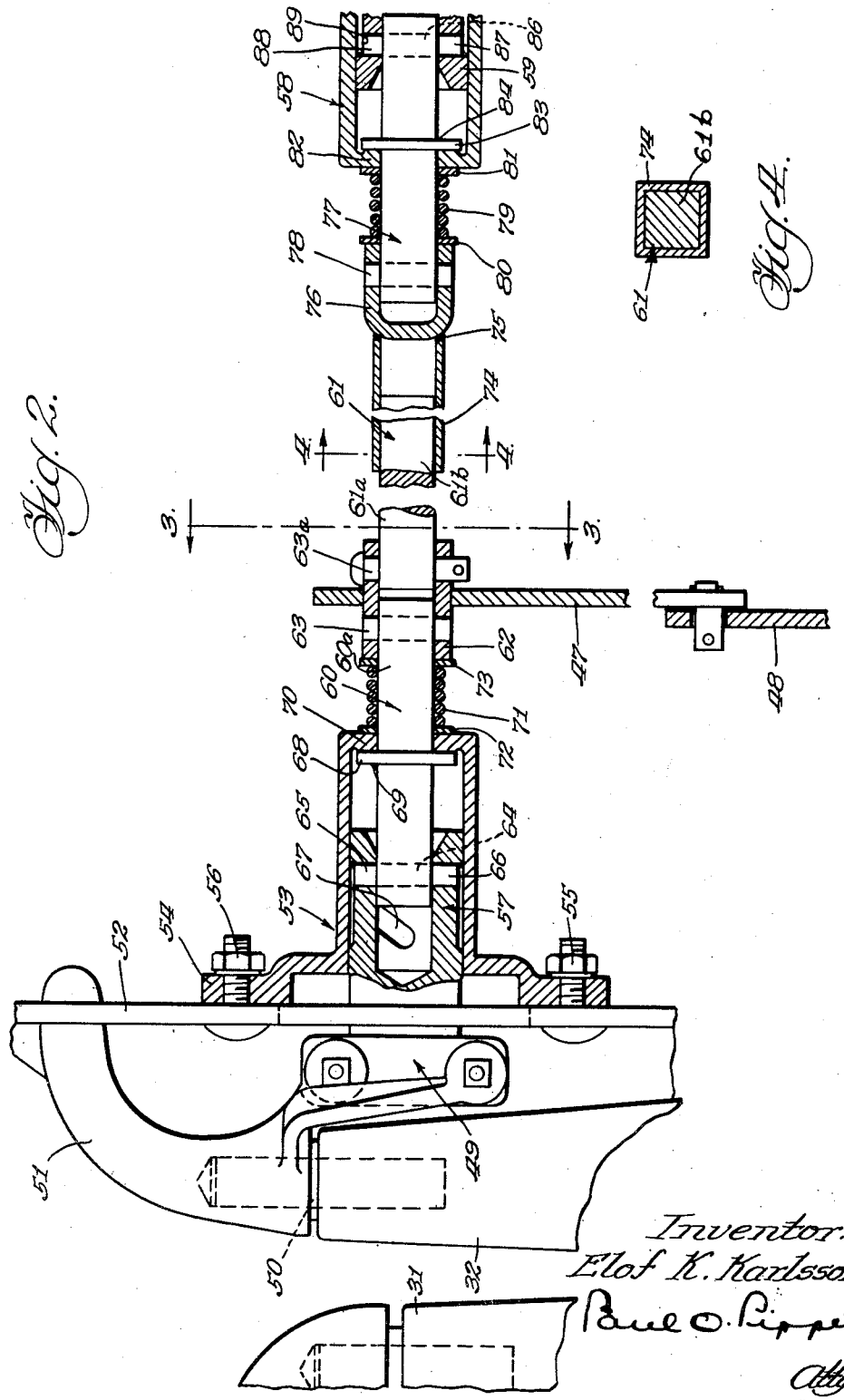

Patented July 14, 1953

2,645,075

UNITED STATES PATENT OFFICE 2,645,075

CORN PICKER ROLL ADJUSTING MECHANISM

Elof K. Karlsson, Moline, Ill., assignor to International Harvester Company, a corporation of New Jersey Application November 16, 1949, Serial No. 127,599

6 Claims. (Cl. 56—105)

This invention relates to a new and improved corn picker roll spacing adjusting mechanism.

Corn picking and snapping rolls are as a rule used in pairs and are arranged and constructed to rotate inwardly toward each other to pull standing stalks downwardly therethrough. This causes a snapping of the ears from the stalks. It is apparent, therefore, that the spacing between cooperative rolls is a critical factor in the successful picking and snapping of corn. Recently, provision has been made in certain corn pickers for effecting roll spacing adjustment by the rather difficult procedure of bolting or otherwise fastening the roll journaling member in one or more of a plurality of spaced openings or notches. The operator of such a corn picker will adjust the spacing of the rolls to a position which he believes should be proper for maximum efficiency. After adjusting the rolls once the operator usually does not attempt another adjustment that day although the condition of the corn being picked might greatly change throughout the day and in different sections of the field, but the effort necessary to readjust the rolls and then possibly have them adjusted in the wrong direction is too great and the picker therefore is used with its initial adjustment regardless of its efficiency.

It is therefore a principal object of this invention to provide means closely adjacent the operator of a corn picker for varying the spacing between cooperative picking and snapping rolls.

An important object of this invention is the provision of means in a corn picker for quickly and easily varying the spacing between cooperative picking rolls throughout a considerable range to compensate for variations in the condition of corn being picked and to relieve the jamming of a picker of "slugs" of stalks.

Another important object of this invention is to permit the operator of a corn picker to adjust the rolls thereof while the machine is in operation and thus immediately determine whether the adjusted position of the rolls is picking and snapping the corn with the desired efficiency.

Another and further important object of this invention is to supply a two-row corn picker with means for simultaneously adjusting the spacing between each of the two spaced cooperative rolls with but a single operating lever.

A further object of this invention is to provide roll spacing means in a two-row corn picker wherein the inner roll of each pair of spaced cooperative rolls is simultaneously moved an equal amount in opposite directions so that the roll spacing of the spaced cooperative rolls is uniform.

Another and still further important object of this invention lies in the provision of spring means for normally urging corn picking rolls toward their maximum spacing and means for concurrently adjusting spaced cooperative rolls for operation against the action of the spring means.

A still further object is to supply single adjustment means for spaced cooperative picking and snapping rolls which automatically compensates for the change in spacing between the spaced cooperative rolls.

Other and further important objects of this invention will become apparent from the disclosures in the following specification and accompanying drawings.

In the drawings:

Fig. 1 is a top plan view of a two-row corn picker incorporating the roll spacing mechanism of this invention.

Fig. 2 is a fragmentary enlarged detail plan view with parts broken away and shown in section of the roll spacing mechanism.

Fig. 3 is a sectional view taken on the line 3—3 of Fig. 2.

Fig. 4 is a sectional view taken on the line 4—4 of Fig. 2.

As shown in the drawings, the reference numeral 10 indicates generally a tractor having a narrow longitudinally extending engine or chassis portion 11, an operator's seat 12 at the rearward end of the chassis, and spaced large traction wheels 13 and 14 carried on axles 15 and 16 which in turn are supported in axle housings 17 and 18 extending laterally outwardly from the rearward end of the tractor chassis 11 adjacent the operator's seat 12.

A two-row corn picker 19 is provided with a first picking unit 20 and a second picking unit 21 disposed longitudinally of the tractor adjacent each side of the engine and chassis. The picking unit 20 is located between the tractor chassis 11 and the spaced large traction wheel 13 and the picking unit 21 is similarly located between the chassis 11 and the large traction wheel 14. Thus the machine on which the roll spacing mechanism is mounted in this illustration is a tractor mounted corn picker, but it should be understood that the roll spacing mechanism will operate equally as effectively on a pull type corn picker.

Each of the corn gathering units is provided with a pair of cooperative rolls 22 and 23 respectively. As shown in Fig. 1 the cooperative rolls 22 lie in the back of a throat formed by a center divider 24 and an outer gathering point 25. Similarly, the rolls 23 are positioned in the corn picking unit 21 between the center divider 24 and the other outer gathering point 26. The center divider along with the gathering points 25 and 26 guide the standing corn and all corn that is fallen or bent over into the throats 27 and 28 just forwardly of the rolls 22 and 23 respectively. Thereafter the cooperative rolls which are driven inwardly toward each other cause the stalk to be fed downwardly therebetween, the ears snapped therefrom, and the snapped ears carried rearwardly and discharged from the machine through wagon loading elevators 29 and 30 extending rearwardly from the corn picker units 20 and 21 respectively, The complete cooperative rolls 22 are designated by the numerals 31 and 32. The upper and rearward ends of the rolls 31 and 32 are equipped with spur gears 33 and 34 which interengage and cause the rolls to be driven in opposite directions. The outer roll 31 is fixedly journaled at 35 and 36 whereas the inner roll 32 is hinged at 37 in a bracket support 38. The hinge 37 consists of merely a loose journalling of the roll 32 in the bracket 38. Thus the inner roll 32 may have its lower forward portion swung about the loose journal hinge 37 away from the outer roll 31. It should be realized that considerable movement at the bottom forward end of the roll results only in slight movement at the upper rear end of the roll and for that reason the loose journal provides adequate hinging.

Similarly, the spaced complete cooperative rolls 23 are designated by the numerals 39 and 40. The outer roll 39 is carried in a stationary journal 41 at its upper rearward end and in a stationary journal 42 at its lower forward end. The inner roll 40 similar to thhe inner roll 32 is mounted for hinged movement at 43 by means of a loose journalling at its upper end and thus the forward lower end may be swung about the loose journal hinge 43 to effect variation in spacing between the outer and inner rolls 39 and 40. The rolls 39 and 40 are provided with spur gears 44 and 45 which mesh with each other to provide drive between the rolls in an opposite direction.

The roll spacing mechanism of this invention is designated by the numeral 46. Link means 47 is attached at its forward end to the roll adjusting mechanism and projects rearwardly for engagement with a hand lever 48 disposed adjacent the operator's seat 12 whereby the operator may adjust the spacing of the rolls during the operation of the corn picker without leaving his seat.

The roll spacing mechanism is shown in detail in Fig. 2. The inner roll 32 of the pair of cooperative rolls 22 is provided with an end journal member 49. This member includes a pin 50 engaging the end of the roll 32 and a stalk guiding curved point 51 which is designed to direct standing stalks of corn into the throat 27 to the space between rolls 31 and 32. A lateral shifting of the journal member 49 will effect swinging movement of the roll 32 about its hinge 37 at the upper end thereof. A supporting structure 52 constitutes a part of the framework of the corn picking mechanisms 20 and 21. A sleeve-like bearing 53 having an outwardly extending annular flange 54 is bolted to the supporting structure 52 at 55 and 56. A lateral extension or sleeve 57 of the journal member 49 slidably engages the sleeve portion of the member 53. The sleeve member 53 is duplicated on the other side of the corn picker as shown at 58 and the member 58 similarly receives for sliding movement an extension or sleeve 59 of a journal 59a of the inner roll 40 of the pair of cooperative rolls 23.

A shaft structure 60 is transversely positioned across the corn picker between the pairs of spaced cooperative rolls. A first part 60a of the shaft structure 60 is positioned adjacent the roll 32. A sleeve 62 is riveted as shown at 63 to the inner end of the shaft part 60a. The link mechanism 47 engages the collar or sleeve 62 for effecting its rotation. This mechanism is best shown in Fig. 3. The outer end of the shaft part 60a is provided with a cross pin 64 having radially extending end portions 65 and 66 which are adapted to engage a spiral or helical slot 67 in the lateral sleeve extension 57 of the journal 49. Rotation of the sleeve 62 thus causes a concurrent rotation of the cross pin 64 and a sliding movement of the sleeve extension 57 within the sleeve 53 of the supporting structure 52. The pin 64 and cooperative helical slot 67 coact as a threaded means. The shaft part 60a is additionally provided with an annular flange or collar 68 welded thereto at 69. The flange 68 is arranged to abut an inwardly extending annular flange 70 forming the end of the stationary sleeve member 53. A spring 71 surrounding the shaft 60 is disposed between a washer 72 abutting the flange 70 and a washer 73 abutting one end of the sleeve 62. The spring is adapted to exert a longitudinal force on the shaft part 60a, thus maintaining it in relatively fixed lateral position while rotation thereof will cause relative longitudinal movement of the journal extension 57 and thus a spacing of the roll 32 with respect to the roll 31. The spring 71 thus arranged tends to keep the cross pin 64 in the one end of the slot 67 constituting the minimum spacing between the rolls 31 and 32.

A second part 61 of the shaft structure 60 is in axial alignment with the first shaft part 60a. One end 61a of the second shaft part 61 is circular in cross section and is received in the sleeve 62 and caused to be rotatable therewith by a removable pin 63a. The other end 61b of the second shaft part 61 is square in cross section and is adapted to telescope a similarly squared sleeve 74 so that rotation applied to the sleeve 62 will be imparted to the sleeve 74. It should be apparent that the cross-sectional shape of the portion 61b and the sleeve 74 may be any type which will permit separate longitudinal sliding and concurrent rotational drive. For the purpose of convenience this shape will be called a polygonal shape. The sleeve 74 is welded at 75 to a bell-shaped housing 76 enclosing a shaft part 77 corresponding to the shaft part 60a on the opposite side of the corn picking machine. The shaft part 77 is fastened for joint rotation to the bell housing 76 by means of a cross pin or rivet 78. A spring 79 corresponds to the spring 71 and is positioned between a washer 80 abutting the end of the housing 76 and a washer 81 which abuts the internal annular flange 82 of the stationary sleeve housing 58. An annular collar or flange 83 is welded at 84 to the shaft part 77 and limits movement of the shaft part 77 in a direction toward the opposite side of the picker. The journal extension member 59 is adapted for sliding movement within the stationary sleeve 58 and the shaft part 77 telescopes the sleeve extension 59 in the same manner as the first shaft part 60a telescoped the sleeve extension 57. A cross pin 86 is mounted in the shaft part 77 and has radial extensions 87 and 88 which engage a spiral slot 89 formed internally of the sleeve extension 59. Here again the pin 86 and cooperative spiral slot are in fact thread means in order to obtain relative longitudinal movement of the parts. The pitch or direction of inclination of the spiral slot 89 is equal and opposite in direction from the spiral or helical slot 67, thus insuring that the inner rolls 32 and 40 will be moved an equal amount in opposite directions so that the roll spacings are the same at all times. All of the several shaft parts and sleeves are jointly termed a shaft structure 60.

In operation, an operator sits on the seat 12 of the tractor-mounted corn picker and drives his machine forwardly through a field of standing corn. If the operator discovers that the picking and snapping rolls are not performing an efficient job of downward stalk feeding and ear snapping, he moves the handle 48 which imparts rotation to the sleeve 62 and as illustrated in Fig. 2 the first extension sleeve 57 will be moved laterally outwardly within the stationary sleeve housing 53, thus making more space between the rolls 31 and 32. Similarly, when the sleeve 62 is rotated, the shaft part 77 is likewise rotated through the driving connection of the polygon-shaped end 61b of the shaft part 61 engaging the corresponding polygonal-shaped sleeve 74 and by reason of the cross pin 86 engaging the helical slot 89 the journal 59a of the roll 40 will be moved toward the center of the tractor in an amount equal to that of the inner roll 32 of the first set of cooperative rolls 22. In view of the fact that the inner rolls 32 and 40 must move inwardly toward each other or outwardly away from each other, it is essential that the length of the operating shaft be capable of expansion and contraction. This required variation in length is automatically accomplished by the telescoping of the square shaft part 61b with the square sleeve 74.

It will therefore be seen that here is provided a simple and easily operative mechanism for effecting lateral adjustment of the inner rolls of spaced cooperative rolls in a two-row corn picker in such a manner that a single operating lever will suffice for the spacing of both sets of rolls and the variation in length occasioned by the spacings of the individual cooperative rolls is automatically accomplished. Numerous details of construction may be varied throughout a wide range without departing from the principles disclosed herein and I therefore do not propose limiting the patent granted hereon otherwise than as necessitated by the appended claims.

What is claimed is:

1. Lateral adjustment mechanism for corn picker rolls comprising a generally longitudinally extending supporting structure, cooperative picker rolls longitudinally disposed and carried on said supporting structure and adapted to be rotatably driven from one end thereof, one of said rolls hinged for lateral swinging movement about one end thereof, a journal support for the other end of the hinged roll, means operatively associated with said journal support adjustably positioning said journal support with respect to said supporting structure for moving that end of the roll toward or away from its cooperative roll, said means including a shaft transversely disposed and carried in said supporting structure, hand lever means for rotating said shaft, said journal support having a sleeve associated therewith and extending laterally and transversely therefrom, said shaft telescoping said sleeve, and thread means interposed between said shaft and sleeve to effect adjustable separation upon rotation of said shaft whereby the hinged roll may be laterally adjusted.

2. A device as set forth in claim 1 in which the thread means interposed between the shaft and sleeve comprises a radially extending pin in the shaft, and said sleeve having a helical slot for reception of said pin.

3. A device as set forth in claim 2 in which spring means normally urges the sleeve toward its maximum telescoped position with respect to said shaft.

4. Lateral adjustment mechanism for corn picker rolls comprising a generally longitudinally extending supporting structure, a first pair of cooperative picker rolls longitudinally disposed and carried on said supporting structure and adapted to be rotatably driven from one end thereof, one of said rolls hinged for lateral swinging movement about its driven end, a journal support for the other end of the hinged roll, means operatively associated with said journal support adjustably positioning said journal support with respect to said supporting structure, for moving that end of the roll toward or away from its cooperative roll, said means including a shaft transversely disposed and carried in said supporting structure, hand lever means for rotating said shaft, said journal support having a sleeve associated therewith and extending laterally and transversely therefrom, said shaft telescoping said sleeve, and thread means interposed between said shaft and sleeve to effect adjustable separation upon rotation of said shaft whereby the hinged roll may be laterally adjusted, a second pair of cooperative picker rolls spaced from the first pair of cooperative picker rolls and adapted to be rotatably driven from one end thereof, one roll of the second pair of spaced apart cooperative picker rolls hinged for lateral swinging movement about its driven end on said supporting structure, said shaft having a portion extending toward said hinged roll of the second pair of cooperative picker rolls, a journal support for the end opposite the hinge of the hinged roll of the second pair of rolls, said last named journal support adjustably positioned with respect to said supporting structure for moving that end of the roll toward or away from its cooperative roll, said shaft portion having a polygonal cross section, a sleeve shaft of corresponding polygonal cross section shape as the shaft portion for telescopically receiving said shaft portion to permit relative longitudinal movement and provide for concurrent rotational movement, a shaft part fixed to said polygonal sleeve, a sleeve formed integrally with the journal support of the hinged roll of the spaced apart second pair of cooperative picker rolls, and thread means interposed between the shaft part and the sleeve of the hinged roll of the spaced apart second pair of cooperative picker rolls whereby the rolls may be simultaneously adjusted in an equal and opposite direction by rotational movement of the single hand lever and may obtain automatic compensation for change in roll spacing by the intermediate positioned telescopic portion of the shaft portion.

5. A device as set forth in claim 4 in which both interposed thread means comprise radially extending shaft pins and the sleeves having helical slots for receiving said pins.

6. A device as set forth in claim 5 in which spring means is provided to normally maintain minimum roll separation.

ELOF K. KARLSSON.

References Cited in the file of this patent

UNITED STATES PATENTS

| Number | Name | Date |
|---|---|---|
| 934,688 | Mueller et al. | Sept. 21, 1909 |
| 1,016,750 | King | Feb. 6, 1912 |
| 1,160,777 | Small | Nov. 16, 1915 |
| 2,004,711 | Thieman | June 11, 1935 |